(12) United States Patent
Jiang et al.

(10) Patent No.: US 10,241,222 B2
(45) Date of Patent: Mar. 26, 2019

(54) SEISMIC ELASTIC WAVE SIMULATION FOR TILTED TRANSVERSELY ISOTROPIC MEDIA USING ADAPTIVE LEBEDEV STAGGERED GRID

(71) Applicant: Landmark Graphics Corporation, Houston, TX (US)

(72) Inventors: Fan Jiang, Sugar Land, TX (US); Shengwen Jin, Sugar Land, TX (US)

(73) Assignee: Landmark Graphics Corporation, Houston, TX (US)

(*) Notice: Subject to any disclaimer, the term of this patent is extended or adjusted under 35 U.S.C. 154(b) by 0 days.

(21) Appl. No.: 15/522,174

(22) PCT Filed: Dec. 31, 2014

(86) PCT No.: PCT/US2014/073016
§ 371 (c)(1),
(2) Date: Apr. 26, 2017

(87) PCT Pub. No.: WO2016/108896
PCT Pub. Date: Jul. 7, 2016

(65) Prior Publication Data
US 2017/0336522 A1    Nov. 23, 2017

(51) Int. Cl.
*G01V 1/28*      (2006.01)
*G01V 1/30*      (2006.01)
*G06F 17/50*    (2006.01)

(52) U.S. Cl.
CPC .............. *G01V 1/282* (2013.01); *G01V 1/30* (2013.01); *G06F 17/5009* (2013.01);
(Continued)

(58) Field of Classification Search
CPC ...... G01V 1/282; G01V 1/30; G01V 2210/50; G01V 2210/626; G01V 2210/67; G06F 17/5009; G06F 2217/16
(Continued)

(56) References Cited

U.S. PATENT DOCUMENTS

2007/0168167 A1    7/2007  Lou
2008/0273421 A1    11/2008 Koren et al.
(Continued)

FOREIGN PATENT DOCUMENTS

EP          0 254 325 A2    7/1987

OTHER PUBLICATIONS

Bernth, et al., "A Comparison of the Dispersion Relations for Anisotropic Elastodynamic Finite-Difference Grids," *Geophysics*, vol. 76, No. 3, May 23, 2011, pp. WA43-WA50.
(Continued)

*Primary Examiner* — Daniel L Murphy
(74) *Attorney, Agent, or Firm* — Haynes and Boone, LLP

(57) ABSTRACT

Disclosed are systems and methods for numerically simulating seismic-wave propagation in tilted transversely isotropic (TTI) media, using an adaptive Lebedev staggered grid. In various embodiments, the adaptive grid includes multiple horizontal zones having different associated grid spacings, which may be determined based on a vertical wave-velocity model. The numerical simulation may involve iteratively solving a set of finite-difference equations including finite-difference coefficients that vary spatially depending on the grid spacing. Additional embodiments and features are described.

17 Claims, 7 Drawing Sheets

(52) U.S. Cl.
CPC .... *G01V 2210/50* (2013.01); *G01V 2210/626* (2013.01); *G01V 2210/67* (2013.01); *G06F 2217/16* (2013.01)

(58) Field of Classification Search
USPC .......................................................... 367/56
See application file for complete search history.

(56) References Cited

U.S. PATENT DOCUMENTS

| | | | |
|---|---|---|---|
| 2009/0122646 A1 | 5/2009 | Lou et al. | |
| 2009/0292511 A1* | 11/2009 | Vrancic | G06F 17/12 703/2 |
| 2012/0263015 A1 | 10/2012 | Zhang | |
| 2014/0188393 A1 | 7/2014 | Alkhalifah et al. | |

OTHER PUBLICATIONS

Fornberg, "Generation of Finite Difference Formulas on Arbitrarily Spaced Grids," *Mathematics of Computation*, vol. 51, No. 184, Oct. 1988, pp. 699-706.

International Search Report and the Written Opinion of the International Search Authority, or the Declaration, dated Sep. 3, 2015, PCT/US2014/073016, 16 pages, ISA/KR.

Jiang, et al. "Hybrid Acoustic-elastic Modeling Method Using Adaptive Grid Finite Difference Scheme in Marine Environment," *75th EAGE Conference & Exhibition Incorporating SPE EUROPEC 2013*, Jun. 10, 2013.

Lisitsa, et al., "Lebedev Scheme for the Numerical Simulation of Wave Propagation in 3d Anisotropic Elasticity," *Geophysical Prospecting*, vol. 58, No. 4, Jul. 1, 2010, pp. 619-635.

Martin, et al. "An Unsplit Convolutional Perfectly Matched Layer Technique Improved At Grazing Incidence for the Viscoelastic Wave Equation," *Geophysical Journal International*, Oct. 1, 2009, vol. 179, No. 1, pp. 333-344.

Pitarka, "3D Elastic Finite-Difference Modeling of Seismic Motion Using Staggered Grids With Nonuniform Spacing," *Bulletin of the Seismological Society of America*, Feb. 1, 1999, vol. 89, No. 1, pp. 54-68.

Tsvankin, "Seismic Signatures and Analysis of Reflection Data in Anisotropic Media," *Society of Exploration Geophysicists*, Jan. 1, 2012.

Virieux, "P-SV Wave Propagation in Heterogeneous Media: Velocity-Stress Finite-Difference Method," *Geophysics*, Apr. 1986, vol. 51, No. 4, pp. 889-901.

Lisitsa et al., "Some Peculiarities of Seismic Waves Propagation in Anisotropic Media, Results of Numerical Simulation", *Proceedings of the KazGeo 2010—1st International Geosciences Conference for Kazakhstan: Where Geoscience Meets the Silk Road*, Nov. 15-17, pp. 73-77.

Search Report dated Nov. 15, 2017 for French Application No. 1561115, 8 pages.

* cited by examiner

SEISMIC ELASTIC WAVE SIMULATION FOR TILTED TRANSVERSELY ISOTROPIC MEDIA USING ADAPTIVE LEBEDEV STAGGERED GRID

PRIORITY

The present application is a U.S. National Stage patent application of International Patent Application No. PCT/US2014/073016, filed on Dec. 31, 2014, the benefit of which is claimed and the disclosure of which is incorporated herein by reference in its entirety.

BACKGROUND

In oil and gas exploration, rock formations or other subsurface media are often characterized based on seismic surveys, i.e., seismic measurements in conjunction with computational modeling of the media and simulation of seismic wave propagation from the seismic sources to the seismic receivers. For example, in a typical land-acquisition geometry, one or more artificial seismic sources, such as explosives, truck-mounted vibrators, or hammers, may be deployed on the earth's surface to excite seismic waves in the subsurface rock formation, and a plurality of seismic receivers, such as geophones, may be distributed on the surface around the source(s) to measure seismic waves resulting from the excitation (such as reflections off geological boundaries). In order to derive information about the formation (such as the thicknesses and materials of its various layers, and the location of oil or gas reservoirs therein) from the seismic measurements, the measurements may be compared with the results of a computational simulation that is based on a computational model reflecting assumptions about the subsurface formation. Discrepancies between measurements and simulation suggest inaccuracies in the model.

Rock formations often include multiple horizontal layers of different materials. When acting as propagation media for seismic waves, such formations display vertical transverse isotropy, i.e., their material properties are independent of the direction of wave propagation within a horizontal plane (i.e., a plane perpendicular to the vertical symmetry axis of isotropy). Such vertically transverse isotropic (VTI) media can be adequately modeled with existing finite-difference elastic modeling approaches, which generally involve numerically solving elastic wave equations discretized over a suitable three-dimensional volume of the formation, using a suitable discretization grid. For tilted transversely isotropic (TTI) media, where a geological boundary and, thus, the plane of isotropy is angled relative to the horizontal plane, however, the conventional approaches generally do not perform satisfactorily in that—in order to avoid inaccurate results or simulation artifacts—they use so fine a grid spacing that they can quickly become computationally intractable.

DETAILED DESCRIPTION

Described herein is an approach for simulating seismic wave propagation that is tailored to TTI media, allowing accurate seismic wave simulation with grid spacings that are large enough to be practicable with currently available processing and data-storage resources. In various embodiments, the approach utilizes a discretization grid that combines features of a staggered Lebedev grid with features of an adaptive grid. In a staggered grid, the set of discretized field variables (e.g., the particle-velocity and stress-tensor components of elastic wave equations) is split into multiple subsets that are stored at different positions within a cell of the grid (the cell being the smallest repetitive unit of the grid). In a Lebedev grid (explained in detail with reference to FIG. 3), specifically, each of the particle-velocity and stress components is split into four variables, resulting in four sub-grid groups for the particle-velocity components and four sub-grid groups for the stress components, which are placed at the eight corners of a half-grid cell, respectively. An adaptive grid is characterized by different grid spacings used in different respective zones of the discretized three-dimensional volume. The grid spacing within each zone is generally chosen based on the value(s) of one or more field-parameters (such as a wave velocity) within that zone, with a view towards finding a suitable trade-off between high numerical accuracy and low computational cost. As a result, computer operations may be improved in that memory usage is reduced, and computation time decreased, while accurate modeling results are maintained.

Figure 1:
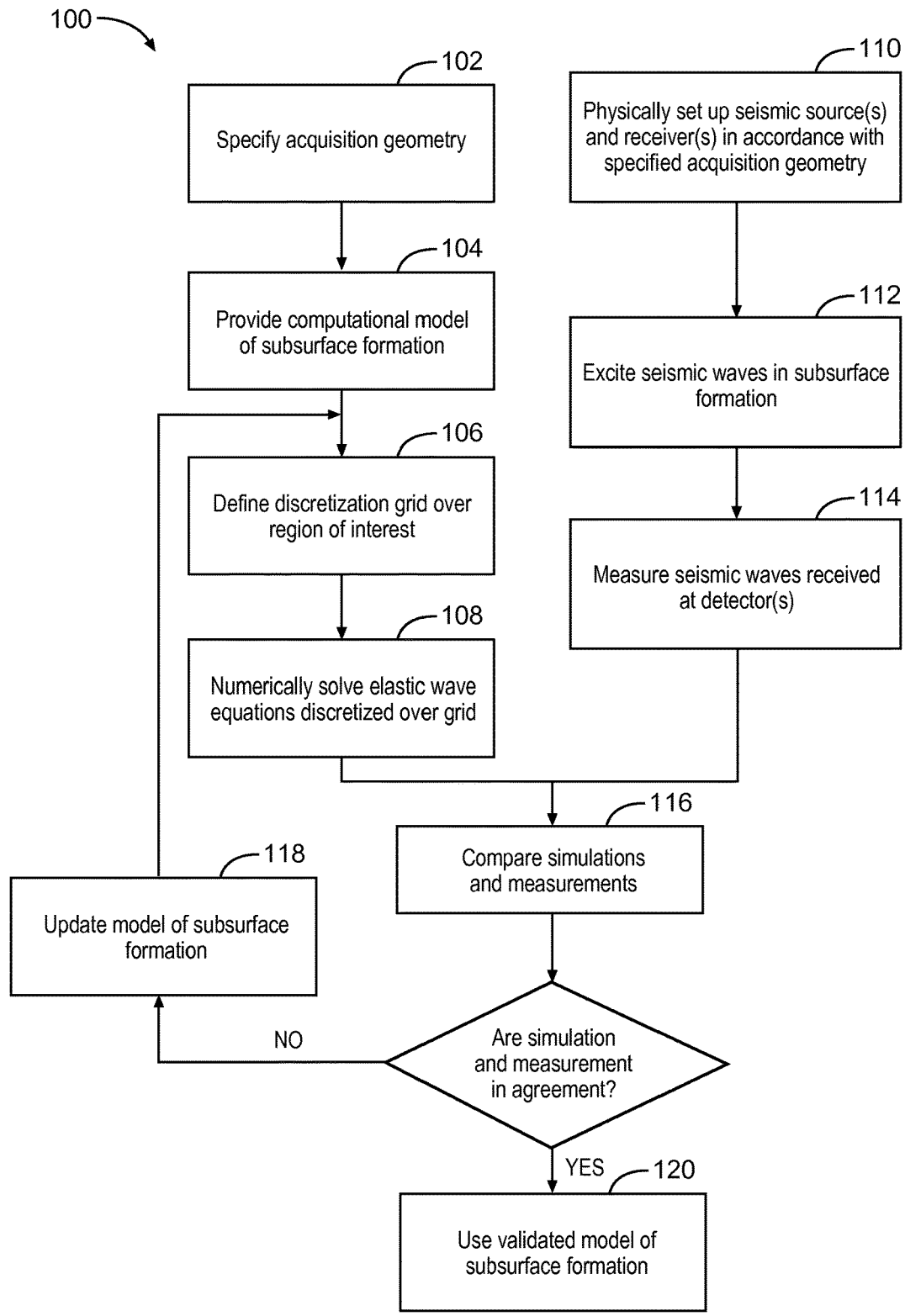
FIG. 1 is a flow chart of a seismic-survey method in accordance with various embodiments.

FIG. 1 is a flow-chart of an example seismic-survey method 100, which includes both seismic wave simulations in accordance with various embodiments and corresponding seismic measurements, as well as comparisons between the results of simulations and measurements. The simulations are based on a computational model of the formation, which may be iteratively adjusted until the physical measurements and computational results of the simulation are in reasonable agreement (e.g., defined by some selected degree of agreement, or convergence) with each other. At that point, the adjusted model of the formation may be used, e.g., for further planning of a drilling operation, or for other purposes.

The simulation prong of the method involves, at operation 102, setting up the acquisition geometry by defining the positions of the seismic source(s) and receiver(s) relative to the formation to be surveyed, e.g., in terms of and with reference to inline, crossline, and elevation. In this context, the elevation is the height of a geographic location above the earth's surface (understood to be an equipotential gravitational surface at the level of the oceans). Inline and crossline specify acquisition directions (e.g., the "shooting directions" of the source(s)). For example, the west-east direction may be used as the inline direction, and the south-north direction may be used as the crossline direction.

Specifying the source and receiver locations determines the acquisition type. Various acquisition types are well-known and routinely used in seismic surveying by those of ordinary skill in the art: in land acquisition, for example, a plurality of receivers are arranged around one or more sources deployed at the surface (i.e., at zero elevation); in marine acquisition, the source(s) and receivers are placed at the sea surface (i.e., also at zero elevation); in ocean-bottom acquisition, the source is generally located at the sea surface, whereas the receivers are placed along the sea bed (corresponding to negative elevation); for vertical-seismic-profile acquisition, one or more of the sources and/or receivers are located below the surface, e.g., at various depths within a borehole; and in a micro-seismic acquisition, the receivers are placed at the earth's surface, but the sources are deployed below surface. The methods disclosed herein are generally applicable to all of these methods, and others. Due to the high cost associated with exciting multiple sources, a single source is often used in conjunction with multiple receivers. However, in principle, it is also possible to use multiple sources in conjunction with a single receiver. Furthermore, to increase the amount of information obtained from the survey (e.g., for the purpose of achieving higher accuracy or spatial resolution, or to resolve ambiguities), some surveys employ a plurality of sources and a plurality of receivers, e.g., arranged along two mutually perpendicular sets of parallel lines for the sources and receivers, respectively.

As shown in FIG. 1, the method 100 further involves providing, for use in subsequent simulations, a computational model of the subsurface formation (see operation 104). The model may include parameters indicative of the geometry and/or material properties of the various formation layers (or other sub-formations) (such as layer thicknesses, positions and orientations, material densities, elastic coefficients, etc.), and/or other physical parameters dependent on and derived from the geometry and material properties (such as wave propagation velocities). These parameters are generally field parameters, i.e., they are defined as a function of and can vary depending on the location within the formation. The type and number of parameters suitable to model a certain formation generally depend on the symmetry properties of the formation. For example, isotropic media are often characterized in terms of the material density p and the propagation velocities $V_{p0}$ and $V_{s0}$ of acoustic and shear waves (which are also often referred to as the "primary" and "secondary" waves, respectively) in the vertical direction. For VTI media as well as horizontally transverse isotropic (HTI) media (where the symmetry axis is horizontal and the various material layers generally lie in vertical planes), three additional parameters characterizing the anisotropy—such as Thomsen's anisotropic parameters $\varepsilon$, $\delta$, and $\gamma$, which are well-known in the art—are usually specified (beyond the density $\rho$ and the acoustic-wave and shear-wave velocities $V_{p0}$, $V_{s0}$).

Figure 2A:
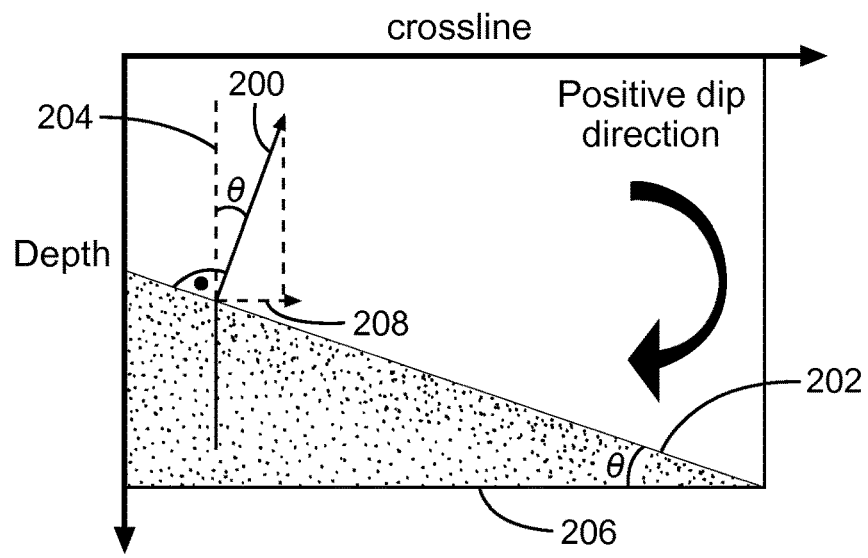
FIGS. 2A and 2B are a vertical cross-sectional view and a top view, respectively, of a TTI formation in accordance with various embodiments.
Figure 2B:
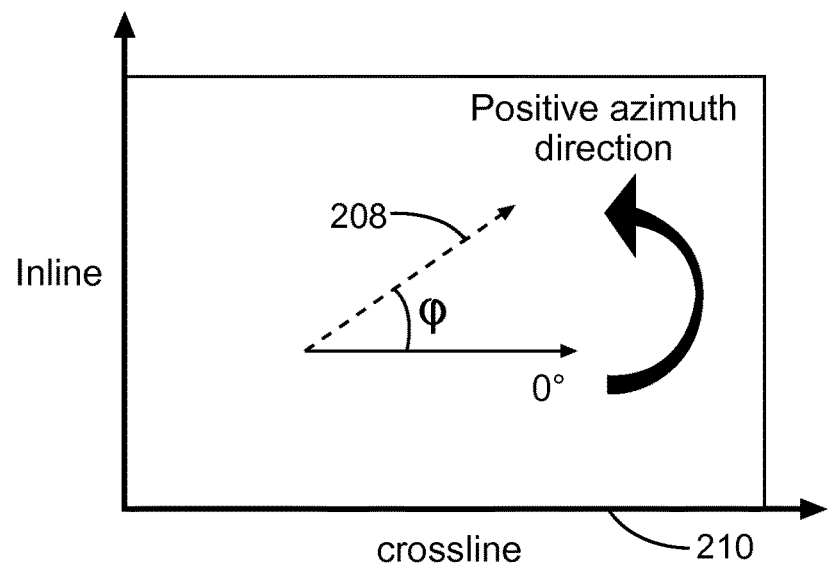

TTI media, which are of interest in various embodiments of the present disclosure, generally include at least one tilted boundary between two sub-surface formations, and are further characterized by the dip angle $\theta$ and the azimuth angle $\phi$ of that tilted boundary. As illustrated in FIG. 2A in a vertical cross-sectional view through the formation, the dip angle $\theta$ is defined as the angle that a normal 200 to the boundary 202 encloses with a vertical axis 204 (or, equivalently, the angle between the plane of, or a plane tangential to, the boundary 202 and a horizontal plane 206). As illustrates in FIG. 2B in a top view of the formation, taken in conjunction with FIG. 2A, the azimuth angle $\phi$ of the tilted boundary 202 is the angle that the projection 208 of the normal 200 into the horizontal plan encloses with the direction of the crossline 210. The boundary 202 need not necessarily be planar throughout the entire modeled region, but may have non-zero curvature; accordingly, the dip angle $\theta$ and the azimuth angle $\phi$ may vary as a function of position (in other words, they are field parameters). Treating dip angle $\theta$ and azimuth angle $\phi$ as field parameters also allows describing multiple geological boundaries that may be present within the formation. In accordance with various embodiments, TTI media are modeled with seven field parameters: dip angle $\theta$, azimuth angle $\theta$, density $\rho$, vertical wave propagation velocities $V_{p0}$ and $V_{s0}$, and Thomsen's anisotropic parameters $\varepsilon$, $\delta$, and $\gamma$.

With renewed reference to FIG. 1, in preparation for simulating seismic wave propagation through the modeled medium, at operation 106, a discretization grid is defined over the region of interest (which may be coextensive with the modeled medium, or include only a portion of thereof). In various embodiments, the discretization grid is a Lebedev staggered grid, as explained with reference to FIG. 3 below. The grid spacing may be chosen based on one or more of the field parameters of the model. For example, for a grid region of uniform grid spacing, the grid spacing dz may be determined based on the minimum shear velocity $V_{smin}$ in that region, in conjunction with the maximum frequency $f_{max}$ of the seismic waves being modeled and the number $n_{grid}$ of grid points per minimum wavelength, in accordance with the dispersion relation for isotropic media: $dz = V_{smin}/(f_{max} \cdot n_{grid})$.

In an adaptive grid, as used in various embodiments, the grid spacing varies between different zones of the modeled region. For instance, in some embodiments, the modeled region is divided, along the vertical direction, into multiple horizontal zones (i.e., zones separated by horizontal boundaries) based on the vertical distribution (i.e., variation in the z direction) of the shear-wave velocity $V_{s0}$ (x, y, z) (or, if the shear-wave velocity is zero, based on the vertical distribution of the acoustic-wave velocity $V_{p0}$). Often, the deeper the position within the formation, the deeper is the velocity. In some embodiments, if the velocity is constant between a depth $Z_1$ and a depth $Z_2$ (e.g., within a water layer), this region constitutes one velocity zone. Further, if an abnormal velocity value is found, e.g., within a salt body (which tends to have much higher velocity and lower density than the surrounding rock), the layer including this salt body may be considered one zone. Regions with abnormally low velocity may be merged with the layer thereabove. The number and size of the horizontal zones may be selected to balance the tradeoff between accuracy and efficiency. For different velocity models, the modeled region may be split, for example, into eight zones, or into only two zones. A particularly beneficial number of zones for the adaptive grid can be achieved if the velocity increases with depth linearly, in which case the modeled region may be split into zones of equal depth. Once the grid spacing and vertical extent of the zones have been determined, the grid size and zone sizes (i.e., the total number grid points or grid points per zone, in each dimension) are determined based thereon.

Following set-up of the discretization grid, seismic waves can be simulated, in operation 108, by numerically solving discretized elastic wave equations. In isotropic elastic media, the applicable elastic wave equations (also referred to as the velocity-stress equations) are:

$$\rho \dot{v}_i = \sigma_{ij,j}$$

$$\dot{\sigma}_{ij} = \lambda \delta_{ij} v_{k,k} + \mu(v_{j,i} + v_{i,j})$$

Herein, $v_i$ are particle-velocity components and $\sigma_{ij}$ are the components of the stress tensor (i, j=x, y, z), which constitute the field variables of the model (i.e., the variable for which the equations are numerically solved); $\dot{v}_i$ and $\dot{\sigma}_{ij}$ indicate the first-order derivatives of the particle-velocity and stress components with respect to time; $v_{i,k}$ and $\sigma_{ij,k}$ indicate the first-order spatial derivatives of the particle-velocity and stress components in the direction of k (k=x, y, z); $\delta_{ij}$ is the Kronecker tensor; and $\lambda$ and $\mu$ are the Lame constants. The sum convention is used, i.e., $v_{k,k} = v_{x,x} + v_{y,y} + v_{z,z}$. For TTI media, the Lame constants are replaced by the stiffness tensor $C_{ij}$, such that the second of the above equations becomes:

$$\frac{\partial}{\partial t}\begin{pmatrix}\sigma_{xx}\\\sigma_{yy}\\\sigma_{zz}\\\sigma_{yz}\\\sigma_{xz}\\\sigma_{xy}\end{pmatrix} = \begin{pmatrix}C_{11} & C_{12} & C_{13} & C_{14} & C_{15} & C_{16}\\ C_{21} & C_{22} & C_{23} & C_{24} & C_{25} & C_{26}\\ C_{31} & C_{32} & C_{33} & C_{34} & C_{35} & C_{36}\\ C_{41} & C_{42} & C_{43} & C_{44} & C_{45} & C_{46}\\ C_{51} & C_{52} & C_{53} & C_{54} & C_{55} & C_{56}\\ C_{61} & C_{62} & C_{63} & C_{64} & C_{65} & C_{66}\end{pmatrix}\begin{pmatrix}\partial v_x/\partial x\\\partial v_y/\partial y\\\partial v_z/\partial z\\\partial v_y/\partial z + \partial v_z/\partial y\\\partial v_x/\partial z + \partial v_z/\partial x\\\partial v_x/\partial y + \partial v_y/\partial x\end{pmatrix}$$

Herein, $C_{ij}$ is computed from the stiffness tensor $C^0$ for VTI media and the bond transformation matrix R, which is a function of the dip angle $\vartheta$ and azimuth angle $\varphi$, according to $C_{ij} = RC^0R^T$ (where $R^T$ is the transpose matrix of R). $C^0$ is the well-known stiffness tensor matrix in VTI media:

$$C^0 = \begin{pmatrix}C_{11} & C_{11}-2C_{66} & C_{13} & & & \\ C_{11}-2C_{66} & C_{11} & C_{13} & & & \\ C_{13} & C_{13} & C_{13} & & & \\ & & & C_{44} & & \\ & & & & C_{44} & \\ & & & & & C_{66}\end{pmatrix}$$

The individual components of the stiffness tensor $C^0$ depend on, and can be straightforwardly computed from, the material properties and related field parameters of the modelled medium, such as the density $\rho$, wave propagation velocities $V_{p0}$ and $V_{s0}$, and Thomsen's anisotropic parameters $\varepsilon$, $\delta$, and $\gamma$.

The velocity-stress equations may be discretized in accordance with a finite-difference scheme in which spatial derivatives of the field variables are expressed, for each grid point (or sub-grid point, as applicable in staggered grids as explained below), in terms of a linear combination of the field-variable values of multiple surrounding grid/sub-grid-point locations, with linear coefficients (in this context also called "finite-difference coefficients") that depend on the grid spacing and are, thus, constant for uniform grid spacing, but spatially variable in an adaptive grid having multiple zones of different grid spacing. The finite-difference coefficients may be computed at the time the grid is set up, prior to iteratively solving the velocity-stress equations. The surrounding grid/sub-grid points may be selected to be distributed symmetrically about the grid/sub-grid point at which the spatial derivative is being evaluated. The number of surrounding grid/sub-grid points used corresponds to the order of the finite-difference scheme; the higher the order, the greater are usually both the accuracy of the simulation and the associated computational cost. In accordance herewith, the finite-difference scheme is generally of second or higher order; in certain embodiments, a $16^{th}$-order (or even higher-order) finite-difference scheme is used.

Numerically solving the discretized velocity-stress equations generally involves stepping through a time loop in which the particle-velocity and stress components are iteratively updated (using the finite-difference coefficients). The time interval (i.e., the inverse of the numerical sampling rate) may be determined based on the minimum grid spacing $dz_{min}$, the maximum pressure wave velocity $V_{pmax}$, the finite-difference coefficients, and the dimensionality D of the model (e.g., 2 for two-dimensional modeling or 3 for three-dimensional modeling) in accordance with:

$$dt = \frac{dz_{min}}{\sum |ci| * \sqrt{D} * V_{pmax}}$$

$\Sigma |ci|$ is the sum of absolute values of the finite-difference coefficients. For adaptive grids, the time interval may be calculated for each velocity zone, and then the smallest time interval among all the zones may be selected for the simulation.

The modeling and simulation in operations 102-108 provides a quantification of the seismic waves (e.g., in terms of particle-velocity components or other physical parameters straightforwardly computed therefrom) received at the receiver locations as a function of time. To test the validity of the model of the formation, these simulated results may be compared with seismic measurements. Accordingly, the seismic-survey method 100 further includes a measurement prong, which involves, at operation 110, physically setting up one or more seismic sources and one or more seismic receivers at locations (relative to the formation) consistent with the acquisition geometry specified in operation 102 for simulation purposes. Then, at operation 112, seismic waves may be excited in the formation using the seismic source(s) (e.g., by detonating explosives, firing an air gun, or striking the ground with a hammer), and, at operation 114, the resulting seismic waves at the receiver locations may be measured. The results of the simulation and measurement may be compared in operation 116. In case of discrepancies exceeding a pre-set threshold, the model of the formation may be adjusted (e.g., by tweaking the field parameters) (operation 118), and the simulation (operations 106, 108) may be repeated with the new model. Once the simulation and measurement are in agreement (within the tolerances set by the discrepancy threshold), the formation model can be deemed accurate, and may be used (operation 120) by geophysicists, geologists, drilling engineers, and others, e.g., as a starting point for further evaluation and/or imaging of the formation, to drive drilling decisions and/or guide drilling operations, etc.

Figure 3:
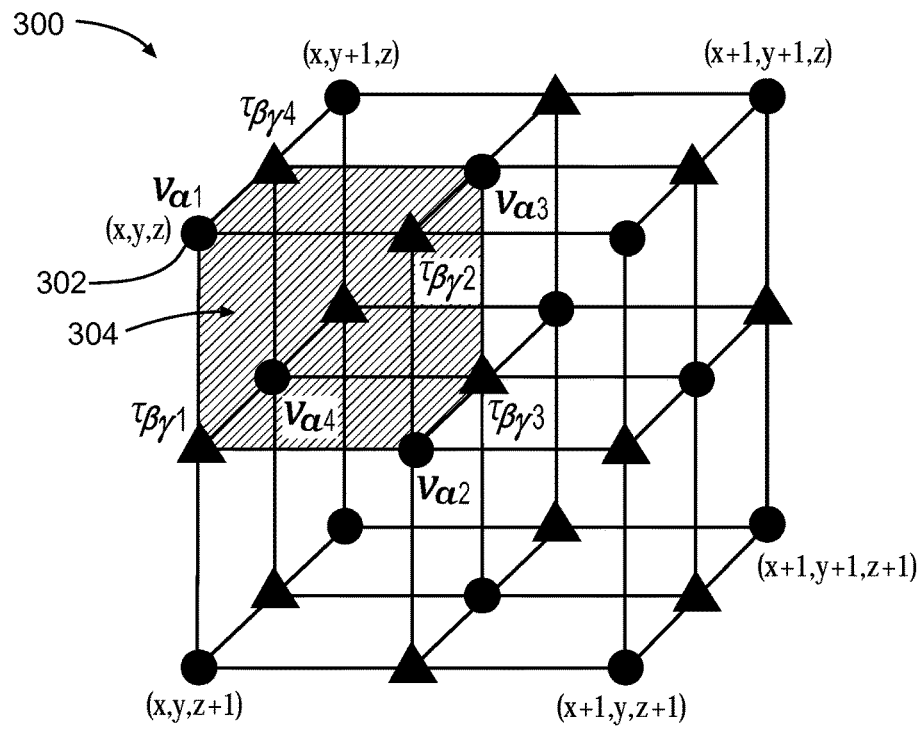
FIG. 3 is a diagram of a grid cell of a Lebedev staggered grid, in accordance with various embodiments.

Turning now to various details of the simulation prong of the seismic-survey method 100, FIG. 3 illustrates an individual grid cell 300 of a Lebedev staggered grid as used, in accordance with various embodiments, to discretize the elastic wave equations in TTI media. The grid cell 300, which may be cubic, is associated with grid location (x, y, z), indicated at 302, and extends along the three perpendicular grid dimension by a unit length in each positive direction (such that it is defined by its eight corners at (x, y, z), (x+1, y, z), (x,y+1, z), (x, y, z+1), (x+1, y+1, z), (x+1, y, z+1), (x, y+1, z+1), and (x+1, y+1, z+1)). The field variables associated with grid point (x, y, z) are located at the corners of a half-grid cell 304 (i.e., a cell of half-unit length extending from the grid point (x, y, z): (x, y, z), (x+½, y, z), (x,y+½, z), (x, y, z+½), (x+½, y+½, z), (x+½, y, z+½), (x, y+½, z+½), and (x+½, y+½, z+1/1). As shown, particle-velocity and stress components are "staggered," i.e., placed at different locations of the half-grid cell. In particular, each particle-velocity component $v_i$ (i=x, y, z) is split into four variables $v_{i1}$, $v_{i2}$, $v_{i3}$, and $v_{i4}$, which are located, respectively, at grid point 302 (x, y, z) and the three diagonally opposed corners of the three faces of the half-grid cell 304 meeting at the grid point 302 (depicted with circles). Similarly, each stress component $\sigma_{ij}$(i, j=x, y, z) is split into four variables $\sigma_{ij1}$, $\sigma_{ij2}$, $\sigma_{ij3}$, and $\sigma_{ij4}$; these variables are located at the remaining four corners of the half-grid cell 304 (depicted with triangles). The Lebedev staggered grid as a whole (i.e., including all grid points) thus has the particle-velocity components located at the grid points and at the centers of the faces of the grid cells, whereas the stress components are located at the centers of the grid cells and the centers of the edges of the grid cells. In the following discussion, all points of a staggered grid at which field variables are placed are referred to as "sub-grid points," whereas the term "grid point" is reserved for the integer-valued points at which the grid cells are anchored. (With this terminology, the grid points form a subset of the sub-grid points.)

With the division of the field variables into four sub-grid groups, the temporal derivatives of the particle-velocity components relate to the spatial derivatives of the stress components as follows:

$$dv_{i1} = dt \cdot \left( \frac{\partial \sigma_{ii2}}{\partial i} + \frac{\partial \sigma_{ij4}}{\partial j} + \frac{\partial \sigma_{ik1}}{\partial k} \right)$$

$$dv_{i2} = dt \cdot \left( \frac{\partial \sigma_{ii1}}{\partial i} + \frac{\partial \sigma_{ij3}}{\partial j} + \frac{\partial \sigma_{ik2}}{\partial k} \right)$$

$$dv_{i3} = dt \cdot \left( \frac{\partial \sigma_{ii4}}{\partial i} + \frac{\partial \sigma_{ij2}}{\partial j} + \frac{\partial \sigma_{ik3}}{\partial k} \right)$$

$$dv_{i4} = dt \cdot \left( \frac{\partial \sigma_{ii3}}{\partial i} + \frac{\partial \sigma_{ij1}}{\partial j} + \frac{\partial \sigma_{ik4}}{\partial k} \right)$$

with (i, j, k)=(x, y, z), (y, z, x), or (z, x, y).
Similarly, the equations for the temporal derivatives of the stress components may be split into four each:

$$d\sigma_{ii1} = dt \cdot \left( C_{11} \frac{\partial v_{i2}}{\partial i} + C_{12} \frac{\partial v_{j4}}{\partial j} + C_{13} \frac{\partial v_{k1}}{\partial k} + C_{14} \left( \frac{\partial v_{j1}}{\partial k} + \frac{\partial v_{k4}}{\partial j} \right) + C_{15} \left( \frac{\partial v_{i1}}{\partial k} + \frac{\partial v_{k2}}{\partial i} \right) + C_{16} \left( \frac{\partial v_{i4}}{\partial j} + \frac{\partial v_{j2}}{\partial i} \right) \right)$$

$$d\sigma_{ii2} = dt \cdot \left( C_{11} \frac{\partial v_{i1}}{\partial i} + C_{12} \frac{\partial v_{j3}}{\partial j} + C_{13} \frac{\partial v_{k2}}{\partial k} + C_{14} \left( \frac{\partial v_{j2}}{\partial k} + \frac{\partial v_{k3}}{\partial j} \right) + C_{15} \left( \frac{\partial v_{i2}}{\partial k} + \frac{\partial v_{k1}}{\partial i} \right) + C_{16} \left( \frac{\partial v_{i3}}{\partial j} + \frac{\partial v_{j1}}{\partial i} \right) \right)$$

$$d\sigma_{ii3} = dt \cdot \left( C_{11} \frac{\partial v_{i4}}{\partial i} + C_{12} \frac{\partial v_{j2}}{\partial j} + C_{13} \frac{\partial v_{k3}}{\partial k} + C_{14} \left( \frac{\partial v_{j3}}{\partial k} + \frac{\partial v_{k2}}{\partial k} \right) + \right.$$

$$\left. C_{15} \left( \frac{\partial v_{i3}}{\partial k} + \frac{\partial v_{k4}}{\partial i} \right) + C_{16} \left( \frac{\partial v_{i2}}{\partial j} + \frac{\partial v_{j4}}{\partial i} \right) \right)$$

$$d\sigma_{ii4} = dt \cdot \left( C_{11} \frac{\partial v_{i3}}{\partial i} + C_{12} \frac{\partial v_{j1}}{\partial j} + C_{13} \frac{\partial v_{k4}}{\partial k} + C_{14} \left( \frac{\partial v_{j4}}{\partial k} + \frac{\partial v_{k1}}{\partial j} \right) + C_{15} \left( \frac{\partial v_{i4}}{\partial k} + \frac{\partial v_{k3}}{\partial i} \right) + C_{16} \left( \frac{\partial v_{i1}}{\partial j} + \frac{\partial v_{j3}}{\partial i} \right) \right)$$

Again, (i, j, k)=(x, y, z), (y, z, x), or (z, x, y). The $C_{ij}$ [replaced "xy" with "ij"] are spatially dependent since they are derived from the velocity $v_{p0}$ and $v_{s0}$, the anisotropic parameters $\varepsilon$, $\delta$ and $\gamma$, and dip angle and azimuth angle. Further, since $\sigma_{ij}$ is defined at different grid position, the relative values of $C_{11}$ to $C_{16}$ are different in the above four equations. Beneficially, with these relations for the four sub-grids, the rotation of a gradient and the divergence of a rotation inherently vanish. Further, there is no need for interpolation of spatial derivatives. Following numerical solution of the elastic wave equations, the particle-velocity and stress components at each grid point can be calculated by summing over respective components of the four sub-grid groups (e.g., $v_x = v_{x1} + v_{x2} + v_{x3} + v_{x4}$).

In a staggered Lebedev grid, the spatial derivatives of the field variables may be expressed slightly differently for different sets of variables. For example, in a fourth-order finite difference scheme, the vertical spatial derivatives (i.e., in the coordinate notation of FIG. 3, the spatial derivative with respect to z) of field variables $G = v_{i2}$, $v_{i4}$, $\sigma_{jk1}$, $\sigma_{jk3}$ (where i,j,k=x,y,z) (which are the field variables located at sub-grid points with half-integer values of z) may be expressed as $$\frac{\partial G}{\partial z}(x, y, z) =$$
$$c_1 \cdot G(x, y, z-2) + c_2 \cdot G(x, y, z-1) + c_3 \cdot G(x, y, z) + c_4 \cdot G(x, y, z+1),$$

and the vertical spatial derivatives of field variables $G = v_{i1}$, $v_{i3}$, $\sigma_{jk2}$, $\sigma_{jk4}$ (where i,j,k=x, y, z) (which are located at sub-grid points with integer values of z) may be expressed as $$\frac{\partial G}{\partial z}(x, y, z) =$$
$$c_1 \cdot G(x, y, z-1) + c_2 \cdot G(x, y, z) + c_3 \cdot G(x, y, z+1) + c_4 \cdot G(x, y, z+2).$$

Note that the selection of grid-point locations in these example equations is such that the field variables are updated based on other field variables at sub-grid points symmetrically arranged around the variable to be updated. For example, the time derivative of $v_{x1}$ located at (x, y, z), depends on the derivative $$\frac{\partial \sigma_{xz1}}{\partial z}(x, y, z),$$

which in turn is computed from $\sigma_{xz1}$ (x, y, Z−2) (located, in a Lebedev staggered grid, at z−3/2), $\sigma_{xz1}$ (x, y, z−1) (located at z−½), $\sigma_{xz1}$ (x, y, z) (located at z+½), and $\sigma_{xz1}$ (x, y, z+1) (located at z+3/2).)

Figure 4A:
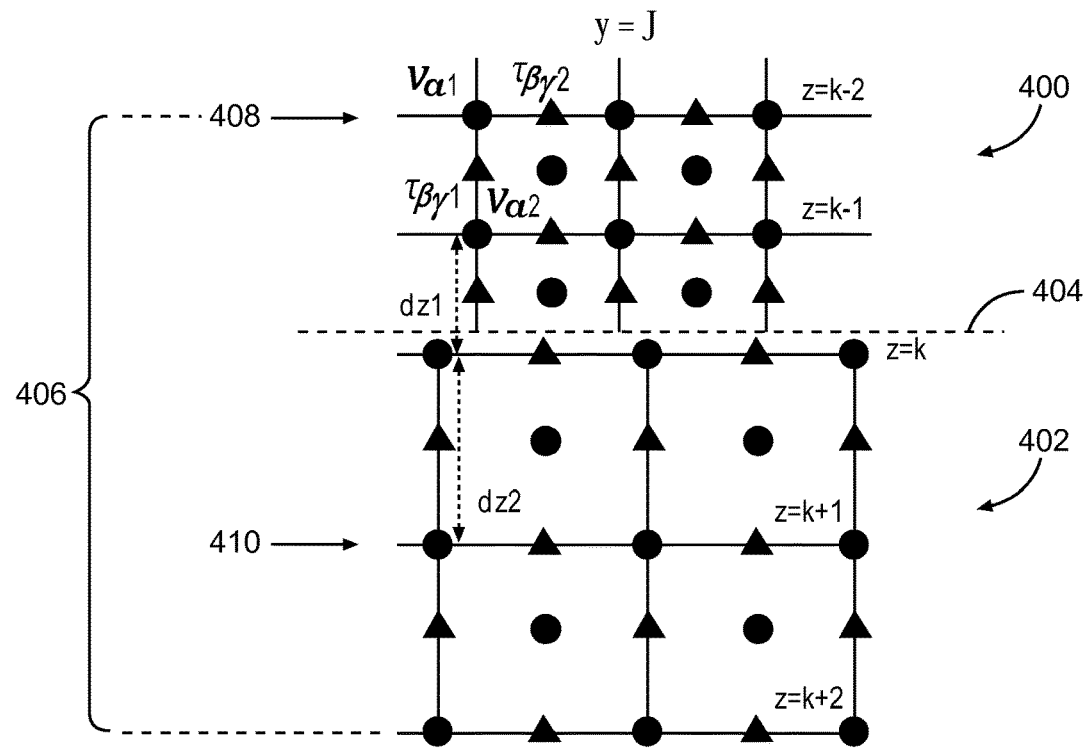
FIGS. 4A and 4B are diagrams of two vertical grid planes, separated by a half cell in the horizontal direction, of an example adaptive Lebedev staggered grid including two zones with different grid spacings, in accordance with various embodiments.
Figure 4B:
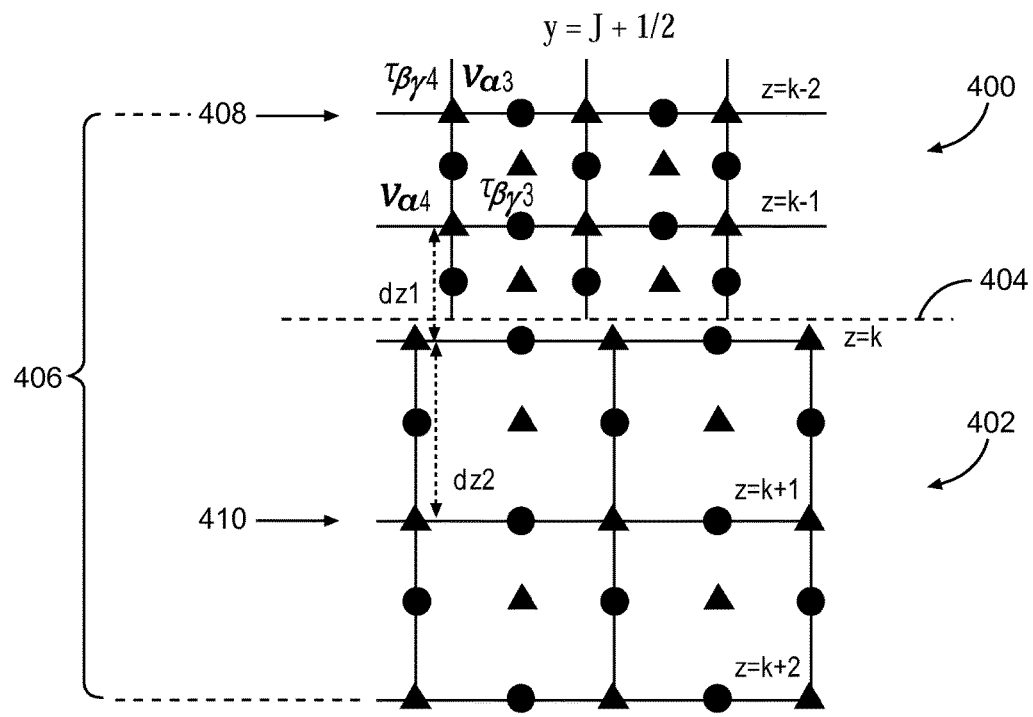

To reduce memory usage and save computational time, various embodiments utilize an adaptive grid, i.e., a grid including multiple zones with different grid spacing. For example, the grid may be divided along the vertical dimension (z) into multiple zones, with grid spacings depending on the vertical shear-wave velocity profile. FIGS. 4A and 4B illustrate a Lebedev staggered grid with two zones 400, 402 separated by a horizontal boundary 404 just above z=k, showing x-z planes of the grid at integer and half-integer positions of y, respectively.

When solving the discretized elastic wave equations, the field variables in most grid cells can be updated using only surrounding grid cells within the same zone. In the vicinity of the zone boundary 404, however, some field variables are updated based on grid cells of both zones 400, 402. Accordingly, an overlap region surrounding the boundary between the two zones can be defined as the region in which each grid cell has at least one associated field variable that is updated based in part on a grid cell of the other zone. As will be readily appreciated by those of ordinary skill in the art, the size of the overlap zone depends generally on the order of the finite-difference scheme, and increases with increasing order.

With reference to FIGS. 4A and 4B, for a fourth-order finite-difference scheme, the overlap region 406 includes four layers of grid cells, which are associated with grid points at z=k−2, k−1, k, and k+1. (Note that the overlap region 402 includes its upper boundary plane at z=k−2, but not its lower boundary plane at z=k+2.) For example, the time derivatives of field variables placed at z=k−3/2 (which include $v_{i2}$, $v_{i4}$, $\sigma_{jk1}$, $\sigma_{jk3}$ associated with grid points at z=k−2), indicated generally at 408, are evaluated using the values of field variables placed at z=k−3, k−2, and k−1 (which belong to zone 400 with smaller grid spacing) and of field variables placed at z=k (which belong to zone 402 with larger grid spacing); accordingly, the grid cells at z=k−2 belong to the overlap region. Similarly, the time derivatives of field variables placed at z=k+1 (which include $v_{i1}$, $v_{i3}$, $\sigma_{jk2}$, $\sigma_{jk4}$ associated with grid points at z=k+1), indicated generally at 410, are evaluated using the values of field variables placed at z=k−½(which belong to zone 400) and of field variables placed at z=k+½, k+3/2, and k=5/2(which belong to zone 402); accordingly, the grid cells at z=k+1 belong to the overlap region. By contrast, using the fourth-order scheme finite difference scheme described above, field variables associated with grid points at z=k−3 and lower can be computed from field variables entirely within the upper zone 400, and field variables associated with grid points at z=k+2 and higher can be computed from field variable entirely within the lower zone 402, as will be readily appreciated by one of ordinary skill in the art. Extending the above-described finite-difference scheme to higher orders, the number of cell layers included in the overlap region may equal the order. Thus, for a $16^{th}$-order finite-difference scheme in accordance with various embodiments, the overlap region may include sixteen layers of grid cells, eight in each of the two zones 400, 402.

Figure 5:
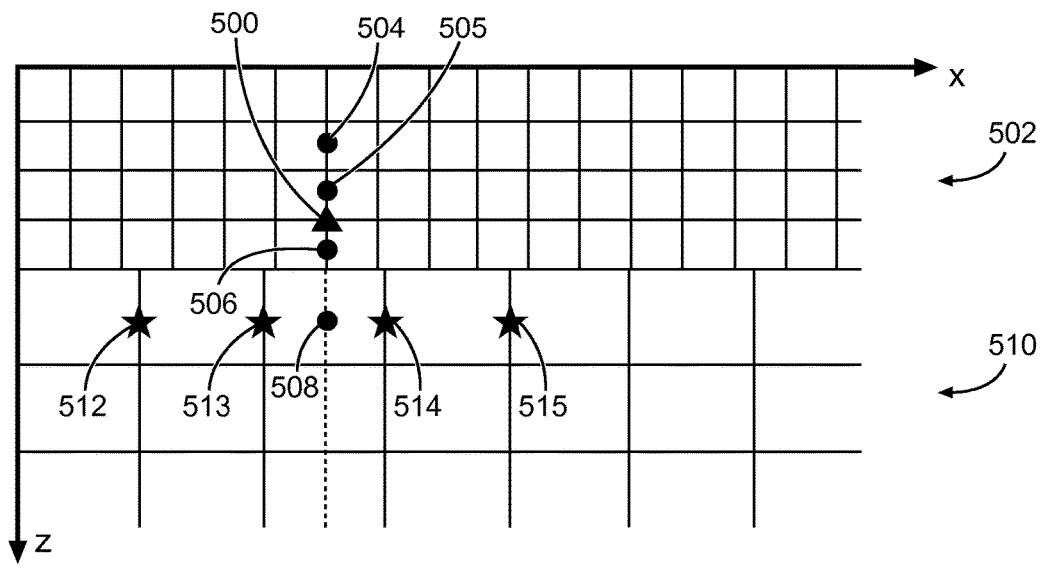
FIG. 5 is a schematic diagram of an adaptive grid, illustrating virtual-grid-point interpolation in accordance with various embodiments.

Since the grid and sub-grid points of two adjacent zones with different grid spacings generally do not align horizontally, the evaluation of a vertical spatial derivative at a sub-grid point in the overlap region may depend on a location where no sub-grid point exists. This is illustrated in FIG. 5, where the vertical spatial derivative at sub-grid point 500, located at z=k−1 within a first zone 502, depends on sub-grid points 504, 505, 506 at z=k−5/2, k−3/2, and k−½within that same zone 502, and desirably on a point 508 at z=k+½, within a second zone 510, that has the same x-y coordinates as sub-grid point 500. Point 508 does, however, not correspond to a sub-grid point in the second zone 510. In various embodiments, this issue is addressed by creating a "virtual sub-grid point" at the (off-grid) location 508, e.g., by interpolating between neighboring sub-grid points 512, 513, 514, 515 at the same vertical position z=k+½.

Figure 6B:
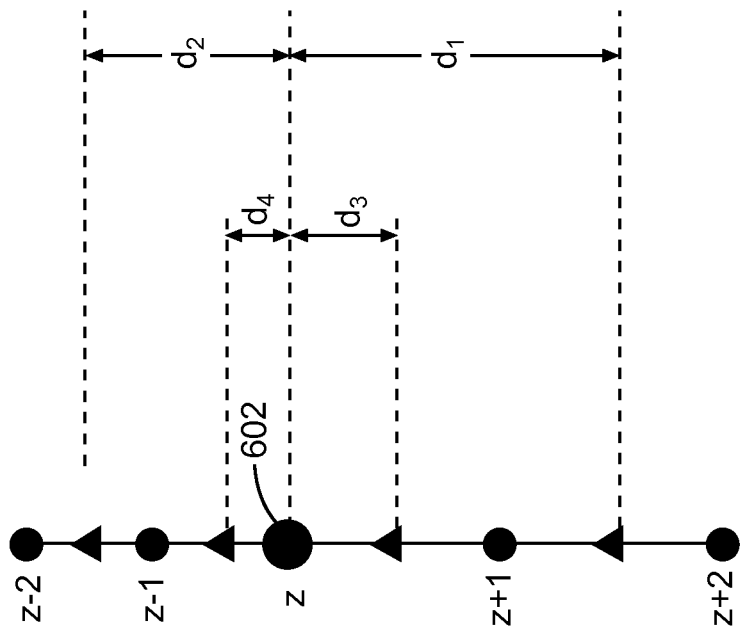
FIGS. 6A and 6B are diagrams of vertical skeletons of an adaptive staggered grid, illustrating grid spacing indexes, in accordance with various embodiments, for sub-grid points at half-integer and integer vertical locations, respectively.
Figure 6A:
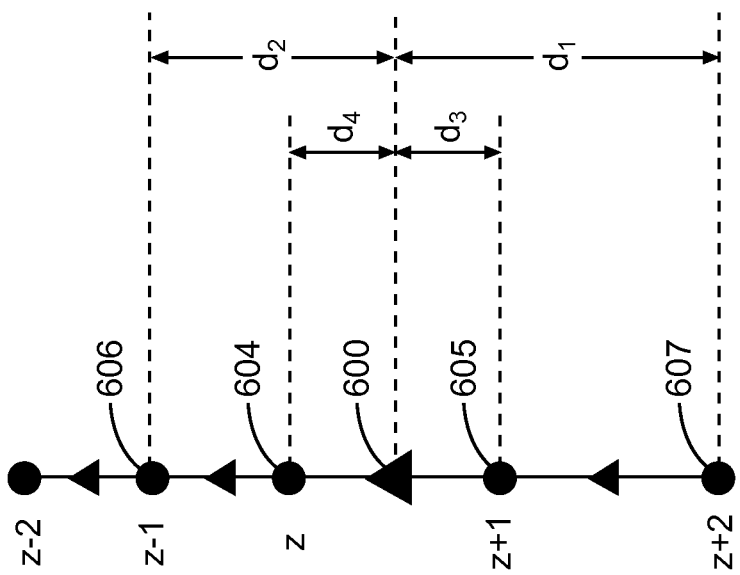

In various embodiments, the finite-difference coefficients $C_i$ (e.g., with i=1, 2, 3, 4 for a fourth-order finite-difference scheme) used within the expressions for spatial derivatives $$\frac{\partial G}{\partial z}(x, y, z)$$

of the field variables G are computed based on the distances between the sub-grid points at which the derivative is to be evaluated (which may be the grid point (x, y, z) itself or any point within the associated grid cell, such as a point at (x, y, z+½)) and the surrounding sub-grid points used in the expression; these distances are also referred to as "grid spacing indexes." In an adaptive staggered grid, the grid spacing indexes may differ not only between the various zones of different grid spacing, but also between various field-variables located at different sub-grid points within a cell. FIGS. 6A and 6B illustrate the grid spacing indexes d1, d2, d3, and d4 of a fourth-order finite-difference scheme for field variables located at a sub-grid point 600 with a half-integer value of z and at a sub-grid point 602 with an integer value of z, respectively, in a cell anchored at z=k, just below the zone boundary. Depending on the location of the sub-grid point at which the derivative is evaluated relative to the zone boundary, certain grid spacing indexes may or may not be symmetric about that point. For instance, as shown in FIG. 6A, the distances d3, d4 from the sub-grid point 600 to its nearest-neighbor sub-grid points 604, 605 are equal in length, whereas the distances d1, d2 to the second-nearest neighbors 606, 607 are different as a result of different grid spacings. In FIG. 6B, all four grid spacing indexes are different.

The finite-difference coefficients may be determined from a linear system of equations that is formed by approximating the exponentials of the spatial derivatives of the field variables with a Taylor expansion. For example, for a fourth-order finite-difference scheme and using the grid spacing index notation of FIGS. 6A and 6B, the finite-difference coefficients $C_i$ (i=1, 2, 3, 4) can be computed using the following matrix equation:

$$\begin{pmatrix} 1 & 1 & 1 & 1 \\ d1 & -d2 & d3 & -d4 \\ -d1^2 & -d2^2 & -d3^2 & -d4^2 \\ -d1^3 & d2^3 & -d3^3 & d4^3 \end{pmatrix} \begin{pmatrix} c2 \\ c4 \\ c3 \\ c1 \end{pmatrix} = \begin{pmatrix} 0 \\ 1 \\ 0 \\ 0 \end{pmatrix}$$

This matrix equation can be solved with techniques well-known to those of ordinary skill in the art, such as singular value decomposition (for which commercial solvers are readily available).

In various embodiments, numerically solving the elastic wave equations over the modeled region of interest involves the application of special boundary conditions to the boundaries of that region to avoid numerical artifacts such as numerical boundary reflection (which is the apparent reflection of seismic waves off the (numerical) boundary, despite the absence of a coinciding physical boundary). These boundary conditions may take the form of, e.g., convolutional perfectly-matched-layer (C-PML) boundary conditions, as are generally known to those of ordinary skill in the art in a form suitable for use with regular (non-staggered) grids. To incorporate C-PML boundary conditions with adaptive Lebedev staggered grids, each boundary condition may be split (just like the elastic wave equations themselves) into four equations, corresponding to the four sub-grids, to obtain absorbing boundary conditions for each sub-grid. For example, a first boundary condition, C-PML1, may be used to absorb $v_{x1}$ at the boundary.

The main difference between the C-PML conditions and the elastic wave equations applicable to the bulk of the simulated region lies in their spatial derivatives. For a non-staggered grid, the spatial derivative $\partial\sigma_{xx}/\partial x$ applicable to the boundary is re-written in C-PML format as:

$$\Delta_t = b_x \Delta_{t-1} + a_x(\partial\sigma_{xx}/\partial x)$$

$$(\partial\sigma_{xx}/\partial x)_{C-PML} = \frac{1}{k_x}(\partial\sigma_{xx}/\partial x) + \Delta_t$$

Here, $\Delta_t$ is a temporary C-PML array that applies absorbing coefficients to the spatial derivative, and $a_x$, $b_x$ and $k_x$ are damping factors. The spatial derivative $(\partial\sigma_{xx}/\partial x)_{C-PML}$ may be applied in the elastic wave equation at each boundary to absorb the wave thereat so as to avoid boundary reflection. (Analogous equations apply to $\sigma_{yy}$ and $\sigma_{zz}$.) To apply the C-PML conditions to a Lebedev staggered grid, the spatial derivatives are modified as follows:

$$\Delta_t = b_{x1}\Delta_{t-1} + a_{x1}(\partial\sigma_{xx1}/\partial x)$$

$$(\partial\sigma_{xx1}/\partial x)_{C-PML} = (\partial\sigma_{xx1}/\partial x) + \Delta_t$$

Here, $a_{x1}$ and $b_{x1}$ are re-calculated based on the Lebedev grid position, and $k_x$ is set to 1 (and therefore dropped from the equation). For $\sigma_{xx1}$, which is at an integer grid point (x,y,z), $a_{x1}$ and $b_{x1}$ are the same as the conventional damping factors $a_x, b_x$. For $\sigma_{xx3}$, which is at a half-integer grid point (x+½, y+½, z+½), $a_{x3}$ and $b_{x3}$ are set to absorb energy from the half-grid point. Each damping factor is specified for each spatial derivative.

Figure 7:
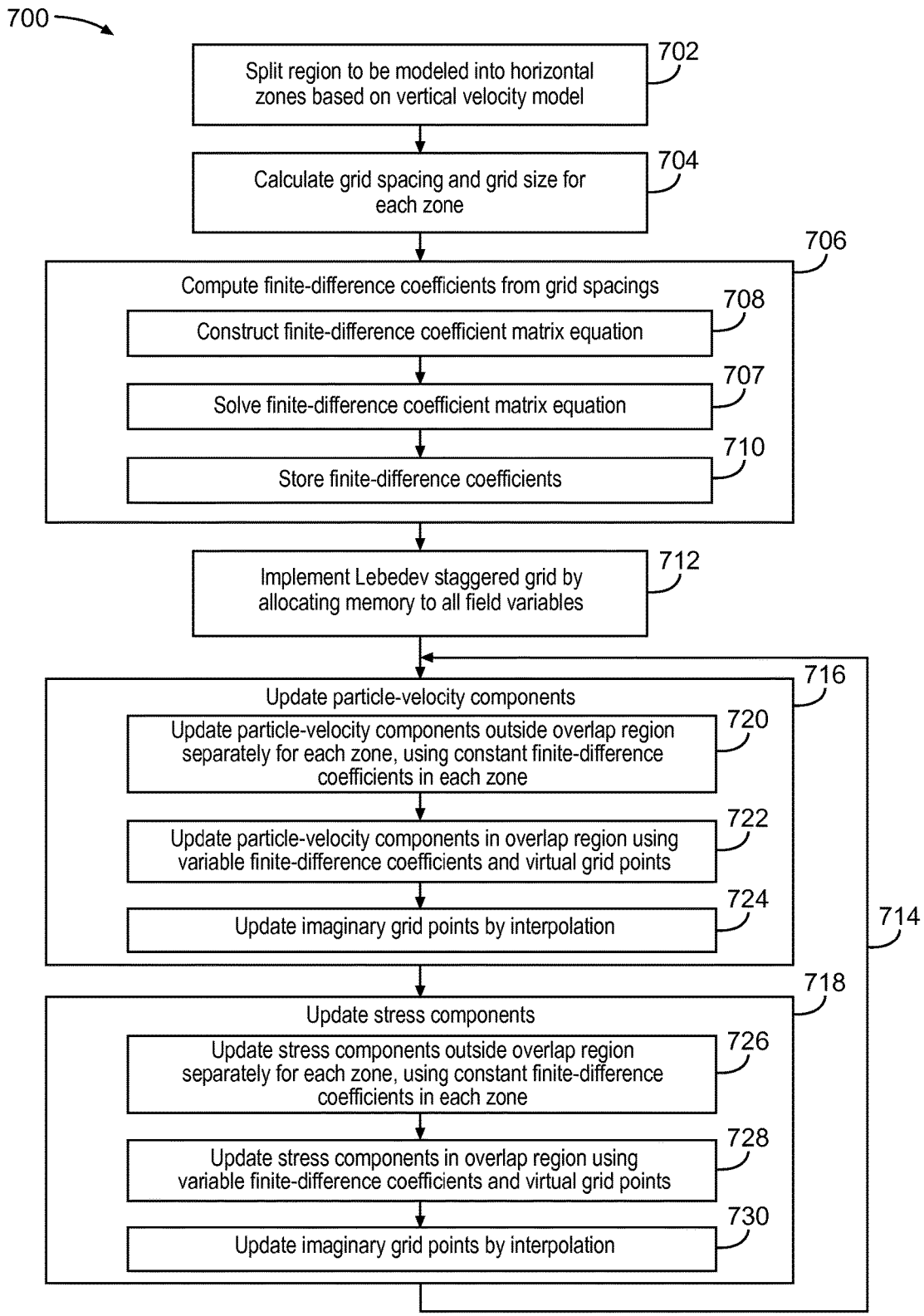
FIG. 7 is a flow chart of an example method for simulating seismic wave propagation in TTI media using an adaptive Lebedev staggered grid, in accordance with various embodiments.

FIG. 7 illustrates an example method 700 for simulating seismic wave propagation in TTI media using an adaptive Lebedev staggered grid, in accordance with various embodiments. Starting point of the method 700 is a computational model of the TTI medium (specifying, e.g., the dip and azimuth angles of the tilted geological boundary, acoustic and shear wave velocities, and Thomsen's anisotropic parameters), in conjunction with a specification of the acquisition geometry. The method 700 involves splitting the region of interest into different horizontal zones (e.g., separated by horizontal boundary planes) based on the vertical distribution of the shear-wave velocity $V_{s0}$ (and, if $V_{s0}$ is zero, of the acoustic-wave velocity $V_{p0}$) (operation 702). For each sub-zone, a suitable grid spacing may then be calculated, e.g., based on the dispersion relation set forth above, and based on the grid spacing, the grid size (i.e., number of grid points) within each zone may be determined (operation 704). From the grid spacings, the finite-difference coefficients may then be computed (for a given finite-difference scheme of specified order) (operation 706). This may involve constructing a finite-difference coefficient matrix equation, e.g., based on a Taylor-series expansion (operation 708), and solving the matrix equation by, e.g., a singular-value-decomposition or least-square-optimization algorithm (operation 709). The finite-difference coefficients thus obtained may then be stored in one or more arrays for subsequent retrieval and use (operation 710). At operation 712, a Lebedev staggered grid is implemented by allocating memory to all field variables in all cells of the grid, where the field variables include four separate variables for each of three particle-velocity and six stress-tensor components, located at various sub-grid positions.

The velocity-stress equations, discretized over the adaptive Lebedev staggered grid, may then be iteratively solved in a time loop 714, in which, alternatingly, particle-velocity components and stress components are updated for all four Lebedev sub-groups (operations 716, 718). Outside the overlap region(s) between the different zones, the particle velocities can be updated within each zone in accordance with a regular finite-difference scheme using constant finite-difference coefficients (computed based on the grid spacing within that zone) (operation 720). Within the overlap region, the particle velocities may be updated based on variable finite-difference coefficients and using imaginary grid points as needed (operation 722), in the manner described above. The field-variable values of any imaginary grid points may be updated by interpolation (e.g., between neighboring points in the horizontal plane including the imaginary grid point) (operation 724). (The order of operations 722 and 724 is generally not crucial because it does not affect the result of the simulation in a significant manner. In some embodiments, updating the velocity components in the overlap region prior to the horizontal interpolation serves to provide some computational-efficiency benefits.) Operations 720, 722, 724 may then be repeated for the stress components (operations 726, 728, 730). The time loop 714 may be traversed as many times as desired to span, with the simulation, a time period of interest. For example, in order to compare the simulation to physical seismic measurements, the simulation may extend over a time period commensurate with the total measurement time from the excitation of a seismic wave up to the last seismic-wave measurement with a detector.

Figure 8:
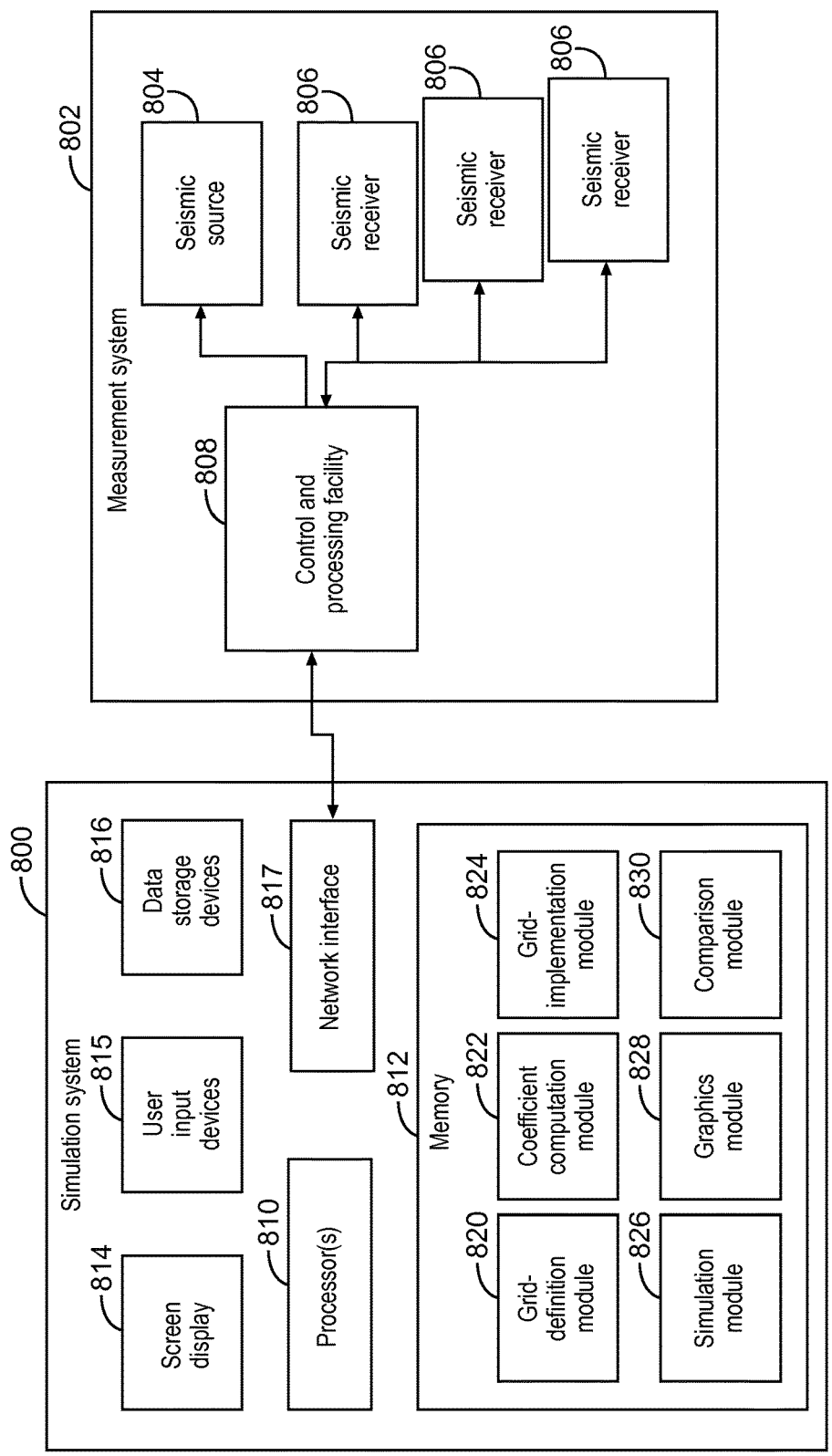
FIG. 8 is a block diagram of an example system for implementing the method of FIG. 7, in accordance with various embodiments.

FIG. 8 is a block diagram of an example system for implementing the method of FIG. 1, in accordance with various embodiments. The system generally includes a simulation system 800 for performing computational seismic-wave simulations as described herein, and a measurement system 802 for acquiring and processing physical seismic-wave measurements. The measurement system 802 generally includes one or more seismic sources 804 (such as an explosive with associated triggering circuitry, a hammer, an airgun, etc.) and one or more seismic receivers 806 (such as geophones, hydrophones, etc.), as well as a control and processing facility 808 in communication with the source(s) 804 and receiver(s) 806 for controlling their operation (e.g., to properly time signal acquisition relative to the excitation of seismic waves) and processing the data acquired by the receiver(s) 806. The control and processing facility 808 may be implemented with any suitable combination of hardware and/or software, e.g., as a general-purpose computer executing suitable software programs, or as a special-purpose computer (like a digital signal processor, field-programmable gate array, etc.)

The simulation system 800 may likewise be implemented by any suitable combination of hardware and software. In various embodiments, the simulation system 800 includes one or more processors 810 (e.g., a conventional central processing unit (CPU), graphical processing unit, or other) configured to execute software programs stored in memory 812 (which may be, e.g., random-access memory (RAM), read-only memory (ROM), flash memory, etc.). Further, the simulation system 800 may include a screen 814, one or more user-input devices 815 (such as, e.g., a keyboard, mouse, etc.), permanent data-storage devices 816 (such as, e.g., a hard drive, disk drive, etc.), and a network interface 817 that facilitates communication with the control and processing facility 808 of the measurement system. In some embodiments, the simulation system 800 receives data from (or sends data to) the control and processing facility 808 via the internet, a local-area network, or some other network. In other embodiments, the data from one system (e.g., the measurement data from the control and processing facility 808) is stored on a computer-readable medium, and then read in from that medium by the other system (e.g., the simulation system 800). Alternatively, the control and processing facility 808 and the simulation system 800 may be integrated into a single computing system, e.g., as different software programs running on the same general-purpose computer. The software programs may implemented in any of various programming languages, for example and without limitation, C, C++, Object C, Pascal, Basic, Fortran, Matlab, and Python.

The software programs of the simulation system 800 include processor-executable instructions implementing the computational methods described herein (e.g., the method of FIG. 7), based on input about the formation and acquisition geometry. These instructions may be organized as modules that implement certain discrete functionalities, such as, for example: a grid-definition module 820 that determines the horizontal zones based on input of a vertical velocity model and calculates the grid spacing and grid size for each zone; a coefficient computation module 822 that computes finite-difference coefficients from the grid spacing and stores them in memory 812; a grid-implementation module 824 that allocates memory for the variables stored at the grid and sub-grid points of the staggered Lebedev grid; and a simulation module 826 that implements a time loop for iteratively updating the field variables. The instructions may further include a graphics module 828 for rendering the simulated elastic waves visually, e.g., on the screen 814, and/or a comparison module 830 that takes input regarding the measurement results from the control and processing facility 808, compares the measurements with the results of the simulations, and presents the results of the comparison to the user (who may then decide whether to revise the model of the formation), perhaps in the form of a display on the screen 814 or hard-copy print-out, and/or automatically updates the formation model in accordance with a programmed algorithm. Further modules implementing additional functionality may be provided. Moreover, as will be readily appreciated by those of ordinary skill in the art, the overall functionality provided by the simulation system 800 may be organized and grouped in many different ways (e.g., including fewer, more, or different modules than depicted), or implemented in whole or in part with dedicated hardware modules instead of software modules. Thus, the depicted embodiment is but one illustrative example.

In summary, use of the embodiments described herein may result in a dramatic reduction in computing resources, improving the operations and functioning of the computer itself: significantly less memory may be used, and the computation time for large datasets may be reduced dramatically. As a result, the value of the services provided by an operation/exploration company may be enhanced to a significant degree.

Although specific embodiments have been illustrated and described herein, it should be appreciated that any arrangement configured to achieve the same purpose may be substituted for the specific embodiments shown. This disclosure is intended to cover any and all adaptations or variations of various embodiments. Combinations of the above embodiments, and other embodiments not described herein, will be apparent to those of skill in the art upon reviewing the above description.

What is claimed is:

1. A method, comprising:
defining positions of at least one seismic source and at least one seismic receiver relative to a tilted transversely isotropic (TTI) medium;
defining an adaptive Lebedev staggered grid over at least a portion of the TTI medium, the grid comprising a plurality of horizontal zones with associated grid spacings, a grid spacing associated with at least one of the zones differing from a grid spacing associated with another one of the zones; and
using a processor, calculating propagation of a seismic wave emitted by the at least one seismic source through the TTI medium and receipt thereof at the receiver by solving a set of elastic wave equations discretized over the adaptive Lebedev staggered grid, wherein the elastic wave equations discretized over the grid comprise finite-difference equations of at least second order,
wherein the finite difference equations comprise finite difference coefficients, the method further comprising calculating the finite-difference coefficients based on the grid spacings, and
wherein the finite-difference coefficients are variable within an overlap region comprising adjacent portions of two of the horizontal zones, and wherein the finite-difference coefficients are constant within each of the horizontal zones outside the overlap region.

2. The method of claim 1, wherein the calculating of the propagation of the seismic wave is based at least in part on a computational model of the TTI medium comprising one or more field parameters.

3. The method of claim 2, further comprising:
emitting a seismic wave with the at least one seismic source;
measuring a seismic wave resulting from the emitted seismic wave with the at least one seismic receiver; and
comparing the measured seismic wave with the calculated seismic wave at the receiver and, if a difference therebetween exceeds a specified threshold, adjusting the computational model of the TTI medium by adjusting a field parameter of the model.

4. The method of claim 2, wherein the field parameters comprise a pressure-wave velocity, a shear-wave velocity, and Thomsen inelastic parameters.

5. The method of claim 2, wherein the field parameters comprise a dip angle and an azimuth angle associated with a tilted geological boundary of the TTI medium.

6. The method of claim 1, wherein defining the adaptive Lebedev staggered grid comprises determining the horizontal zones and the grid spacings associated therewith based at least in part on a shear-wave velocity model specifying a vertically variable shear wave velocity.

7. The method of claim 1, wherein the finite-difference equations are of at least fourth order.

8. The method of claim 7, wherein the finite-difference equation are of at least sixteenth order.

9. The method of claim 1, wherein the finite difference coefficients are calculated using at least one of singular value decomposition or least-square optimization.

10. The method of claim 1, wherein calculating the propagation of the seismic wave comprises updating field variables using the finite-difference equations, and wherein updating the field variables in an overlap region that includes adjacent portions of two of the horizontal zones is based on field variables in both of the two horizontal zones.

11. The method of claim 10, wherein updating the field variable in the overlap region comprises creating imaginary grid points by interpolation between real grid points.

12. The method of claim 1, wherein defining the positions of the at least one source and the at least one receiver comprises specifying an acquisition type.

13. The method of claim 1, wherein calculating the propagation of the seismic wave comprises applying convolutional perfectly-matched-layer boundary conditions.

14. The method of claim 1, further comprising:
displaying, using a display or printing apparatus, the propagation of the seismic wave emitted by the at least one seismic source through the TTI medium.

15. A system, comprising:
at least one seismic source for emitting a seismic wave into a TTI medium;
at least one seismic receiver configured to detect a seismic wave propagating through TTI medium; and
a computational facility configured to:
receive information about positions of the at least one seismic source and the at least one seismic receiver relative to the rock formation,
define an adaptive Lebedev staggered grid over at least a portion of the rock formation, the grid comprising a plurality of horizontal zones with associated grid spacings, a grid spacing associated with at least one of the zones differing from a grid spacing associated with another one of the zones,
based at least in part on a computational model of the TTI medium, calculate propagation of a seismic wave emitted by the at least one seismic source through the formation and detection thereof at the receiver by solving a set of elastic wave equations discretized over the adaptive Lebedev staggered grid, and
compare the detected seismic wave with the calculated seismic wave at the receiver and, when a difference between the detected and calculated seismic waves exceeds a specified threshold, adjusting the computational model by adjusting at least one field parameter thereof, wherein the elastic wave equations discretized over the grid comprise finite-difference equations of at least second order,
wherein the finite difference equations comprise finite difference coefficients and calculating the finite-difference coefficients based on the grid spacings,
wherein the finite-difference coefficients are variable within an overlap region comprising adjacent portions of two of the horizontal zones, and
wherein the finite-difference coefficients are constant within each of the horizontal zones outside the overlap region.

16. The system of claim 15, wherein the computational facility is further configured to determine the horizontal zones and the grid spacings associated therewith based at least in part on a shear-wave velocity model specifying a vertically variable shear wave velocity.

17. The system of claim 15, wherein the discretized elastic wave equations comprise finite-difference equations of at least sixteenth order.

* * * * *